Feb. 2, 1965 L. J. KONOPKA 3,168,126
SAW AND MITER GUIDE
Filed May 14, 1963 2 Sheets-Sheet 1
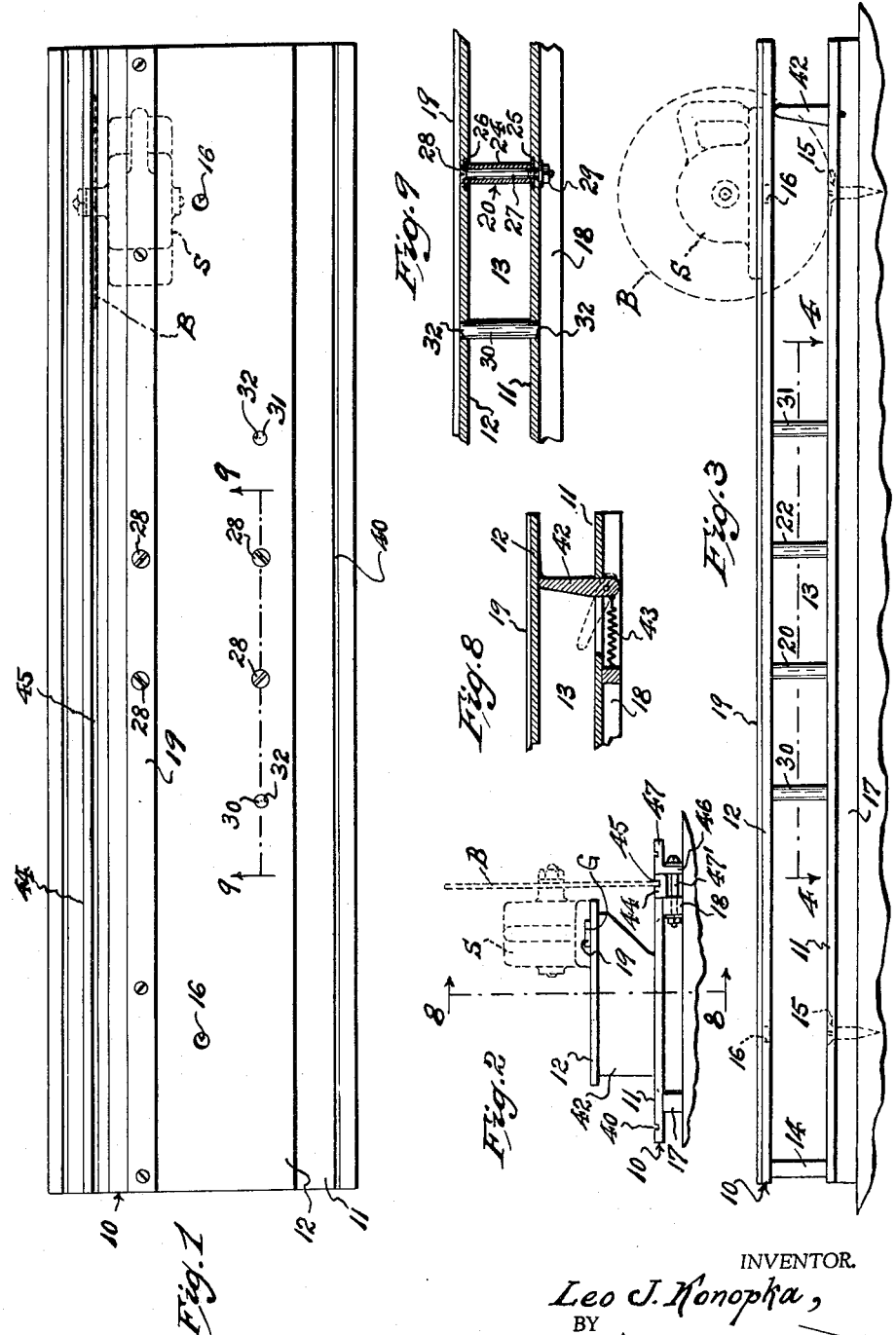
INVENTOR.
Leo J. Konopka,
BY
Dudley B. Howard
Attorney

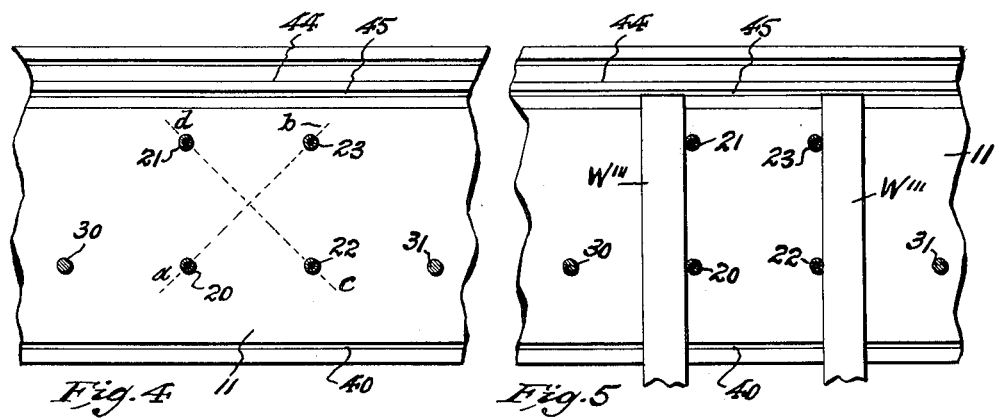
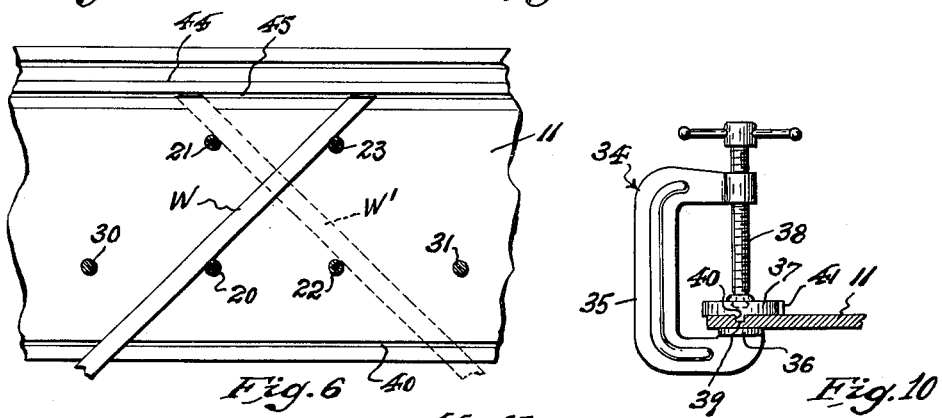
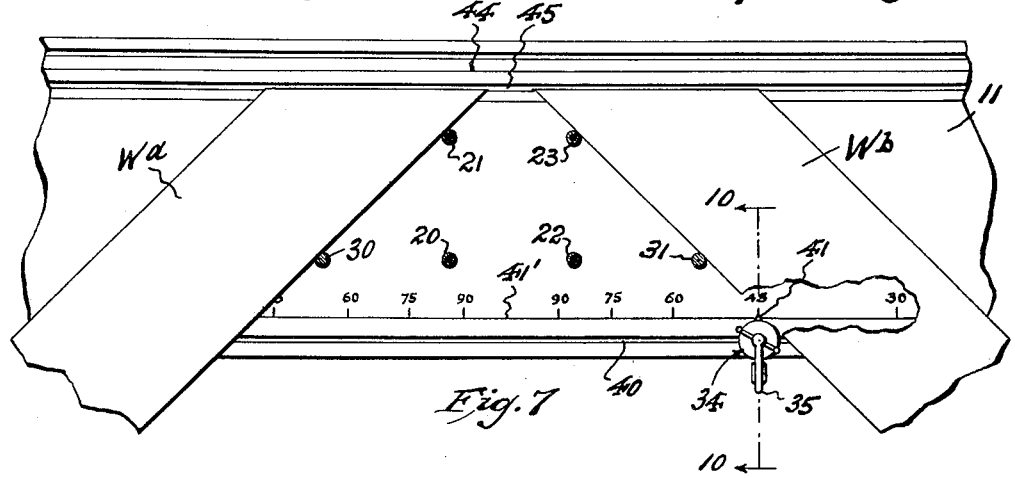

United States Patent Office 3,168,126
Patented Feb. 2, 1965

3,168,126
SAW AND MITER GUIDE
Leo J. Konopka, 72 Rockwood Road, Florham Park, N.J.
Filed May 14, 1963, Ser. No. 280,258
6 Claims. (Cl. 143—6)

The invention relates in general to guide means for the miter-cutting of strips of molding or boards, and has particular reference to devices of this kind which are adapted for use with portable rotary saws.

The prior art mitering devices in which the cutting operation is performed by a portable rotary saw include complicated and expensive mechanisms requiring tedious re-setting manipulation when changing the angle of cut. Consequently, the production of mitered products is very slow.

It, therefore, is the primary object of my present invention to provide an improved saw and miter guide which is of extremely simply construction and is capable of fast operation without any sacrifice of accuracy.

To be more explicit, my device includes a double-deck frame formed by a lower table adapted to be mounted on a work-bench, or a pair of saw-horses, and an upper table overlying the lower table and supported in vertically spaced relation thereto by spacing means, whereby a transverse through passage between tables for insertion of successive workpieces is provided. Both cooperative tables are elongated and rectangular in horizontal plan and the frame is intended to be arranged so that the operator stands in front of one end and can readily feed a molding strip laterally through the workpiece passage and hold it steady with one hand while operating the saw with the other. The saw is a power-driven rotary one and is mounted to slide from front to rear and reversely along a straight track, or guide, member that is supported by the top face of the upper table. To aid the operator in positioning the workpiece at the desired angle for each cut, i.e. usually at right-angles to the saw track or at an angle of forty-five degrees thereto, a geometrically arranged set of main workpiece angle-positioning guide stops is fixedly positioned in the workpiece passage between the tables.

A strip of wood or other saw-penetrable material arranged lengthwise beneath the path of the saw is inlaid in the lower table and is of such thickness that the saw will cut a shallow groove in its upper face. The groove thus cut serves as a workpiece cut-positioning visual guide. Each strip of molding stock, or other workpiece, will be marked initially by pencil at the desired location of each miter cut. Consequently, all the operator has to do to position the stock in the frame for location of the cut at the predetermined point is to introduce the stock until the pencil mark is directly above the visual guide groove just mentioned. After pressing the workpiece firmly against the selected angle-positioning stops, the saw may be operated to perform the miter cut.

Another object of the invention is to provide supplementary workpiece angle-positioning guide stops for use whenever the workpiece happens to be a board too wide to be accommodated by the space intervening between main guide stops, or for use in making miter cuts at angles other than at ninety degrees or forty-five degrees to the saw track.

It is also an object of the invention to provide means to permit insertion of a workpiece into the workpiece passage from front to rear through the front end of the frame. While maintaining rigid spacing means at the rear end of the frame and at other adjacent locations to support the upper table in spaced relation to the lower table, I have provided a retractable support at the front end. When a workpiece is pressed rearwardly against this front support, the latter is flipped back and down against the biasing action of a spring into a recess in the lower table to permit introduction of the workpiece. Thereafter, the spring restores the front support to operative position in dead-center relation to the two tables.

Still further objects, advantages and features of the invention will become apparent as the following specific description is read in connection with the accompanying drawings, in which:

FIG. 1 is a top plan view of the device, showing a portable rotary saw applied thereto diagrammatically in broken lines;

FIG. 2 is a front elevation;

FIG. 3 is a side elevation;

FIG. 4 is a fragmentary horizontal section on line 4—4 of FIG. 3, with the saw omitted, showing the complete set of main and supplementary angle-positioning guide stops;

FIG. 5 is a view similar to FIG. 4, showing in solid lines two molding strip workpieces in position abutting the front and rear pair of main guide stops for square cuts;

FIG. 6 is a similar view showing in solid lines one molding strip workpiece in position abutting the left-rear and right-front main guide stops for a right-hand miter cut, and in broken lines a second molding strip workpiece abutting the left-front and right-rear main guide stops for a left-hand miter cut;

FIG. 7 is a similar view showing in solid lines one board too wide for insertion into the space between main guide stops abutting the rear fixed supplementary guide stop and right-rear main guide stop for a right-hand miter cut, and a second wide board abutting the front fixed supplementary guide stop and the right-front main guide stop for a life-hand miter cut, the adjustable supplementary guide stop being shown in the clamped position assumed when used in substitution for the front fixed supplementary guide stop;

FIG. 8 is a fragmentary vertical section on line 8—8 in FIG. 2, showing the retractable front spacing member for the lower and upper tables in upright operative position in solid lines and in retracted inoperative position in broken lines;

FIG. 9 is an enlarged vertical section on line 9—9 in FIG. 1, showing the structure of the main guide stops; and FIG. 10 is an enlarged view on line 10—10 in FIG. 7, showing the sliding fit between the spline of the adjustable supplementary guide stop and the cooperative groove in the lower table.

Referring now in detail to the drawings, wherein like reference characters designate corresponding parts in the several views, it will be observed that the invention includes a frame 10 whose principal structural components are a lower table 11, an upper table 12, and means to space both of said tables vertically to provide a transverse through passage 13 therebetween for feeding workpiece stock into and out of backing contact with workpiece angle-positioning guide stops to be described more fully later herein.

Tables 11 and 12 are elongated and horizontally rectangular in plan view. The side edges of lower table 11 are parallel with the side edges of upper table 12. At the rear end of frame 10, a vertical transverse spacing wall 14 connects tables 11 and 12 in a rigid manner. Additional vertical table-spacing and strengthening means located at the front end of the frame and at points intermediate of its ends will be understood as the description progresses.

In the use of my invention either indoors or outdoors, lower table 11 will be mounted on a suitable support, such as a work-bench or saw-horses (not shown). For this purpose, said lower table is provided along its center line with plural vertical screw-holes 15 for reception of the necessary attaching screws (not shown) and upper table 12 is provided with holes 16 in vertical alignment with holes 15 for insertion of a screwdriver by which the said attaching screws may be driven into the support or disengaged therefrom.

Lower table 11 is reinforced by a pair of longitudinal base flanges 17 and 18 of equal depth which depend from the side edges thereof. Incidentally, flange 18 serves an additional purpose to be described later herein. The necessity for strength of the frame structure should be understood when it is explained that lower table 11 must support both upper table 12 and the portable rotary power saw S, which operates back and forth on a straight track member 19 that extends along the top face of said upper table in parallelism with the side edges of both tables.

There are numerous types of portable rotary power saws available on the market which are already suitable for use with my present invention or can be converted readily for that purpose. The only requirement is that the saw base shall have a groove G paralleling the plane of the circular saw blade for longitudinal sliding engagement with track member 19. It is to be understood, however, that it is within the scope of the invention to adopt any equivalent track and saw base guide structure which may be practicable for my use. As shown in FIGS. 1 and 2, track member 19 is located adjacent to the right side edge of upper table 12 in such a position that the saw blade B will overhang the said side edge with its cutting edge reaching to a depth slightly below the top face of lower table 11.

Intermediately with respect to the front and rear ends of frame 10, a set of fixed main workpiece angle-positioning guide stops is located athwart the workpiece passage 13 extending transversely between lower and upper tables 11 and 12. This set comprises four guide stops 21 (right-rear), 20 (left-rear), 23 (right-front) and 22 (left-front) which are arranged in a square having its diagonals a–b and c–d at an angle of 45 degrees to the side edges of tables 11 and 12 and to track member 19. (See FIG. 4.) Main guide stops 20–21–22–23 preferably are vertical posts of circular cross-section that extend entirely through workpiece passage 13 from lower table 11 to upper table 12. It is to be understood, however, that stop means of other equivalent construction may be substituted within the scope of my invention. Since it is desirable to utilize these guide stops as load supports for the medial portion of upper table 12, I have adopted the post construction shown in detail in FIG. 9, wherein each main guide stop includes a vertically elongated spool-shaped tubular body 24 that has bottom and top radial flanges 25 and 26 respectively abutting the vertically opposed inner faces of lower table 11 and upper table 12. A tension member 27, preferably in the form of a bolt, pierces tables 11 and 12 and extends through stop body 24 with its transversely kerfed head 28 countersunk in upper table 12 and a clamping nut 29 screwthreaded on its opposite end for engagement with the bottom face of lower table 11.

The fixed main guide stops 20–21–22–23 just described are especially provided for use in making right-angled cuts or mitered cuts at an angle of 45 degrees when using slender workpiece stock, such as molding strips, which can be inserted through the space between the said main guide stops in a mode of operation to be described in detail later herein under the heading: "Operation."

It sometimes becomes necessary to miter-cut boards that are too wide for insertion through the spaces between main guide stops 20–21–22–23 in making mitered cuts, so I have provided two fixed-position supplementary workpiece angle-positioning guide stops 30 and 31 (FIG. 4) which preferably are in the form of solid cylindrical posts or pins corresponding throughout their length in diameter to the bodies 24 of said main guide posts. These supplementary guide stops are arranged parallel to the left side edges of lower and upper tables 11 and 12 in horizontal alignment with main guide stops 20 and 22. Supplementary guide stop 30 is in rear of main guide stop 20 and spaced therefrom at the same distance that main guide stops 20 and 22 are spaced from each other. Similarly, supplementary guide stop 31 is in front of main guide stop 22 and spaced therefrom at the same distance that main guide stops 20 and 22 are spaced from each other. The mode of employment of these supplementary guide stops will be described later.

Because supplementary guide stops 30 and 31 will interfere with right-angled cutting of any workpiece stock, whether narrow or wide, it is preferable to provide for readily removable installation of the said guide stops. This has been accomplished by drilling vertically aligned holes 32 in upper and lower tables for the removable reception of supplementary guide stops 30 and 31. The clearances should be such that these guide stops will have only a friction fit in their respective holes and may be lifted therefrom readily when not needed.

In addition to the two supplementary guide stops 30 and 31 just described, I have provided a third supplementary guide stop 34 which differs from the others in being translatable along a straight fore-and-aft path outwardly adjacent to and paralleling the left hand row of main guide stops 20 and 22 and supplementary guide stops 30 and 31. (See FIGS. 7 and 10.) This supplementary guide stop 34 is intended primarily for use in cutting miters at angles other than 45 degrees. It includes a substantially C-shaped clamp body 35 having a stationary lower jaw 36 for engagement beneath the left-hand marginal portion of lower table 11. A cylindrical disk-like movable jaw 37 is swiveled on the lower end of an adjusting screw 38 that extends vertically through a screwthreaded hole in the upper end portion of clamp body 35. Movable jaw 37 has a diametrical spline 39 formed on its bottom face for horizontal fore-and-aft sliding engagement with a groove 40 cut in the top face of lower table 11 closely parallel to the left edge of the latter.

Movable jaw 37 of supplementary guide stop 34 has a vertical index ridge 41 on the inner side of its peripheral face at right angles to spline 39 arranged to traverse a linear scale of measurement 41' paralleling groove 40 which is graduated in angular degrees related to the miter-cuts, as will be explained in connection with the mode of operation. (See FIG. 7.) Incidentally, translatable supplementary guide stop 34 can conveniently be used in substitution for either fixed supplementary guide stop 30 or 31 or to replace a broken main guide stop (20, 21, 22 or 23) in a manner to be described later herein.

It is sometimes not convenient to introduce workpiece stock into workpiece passage 13 by lengthwise insertion from one side of frame 10, so I have provided a retractable spacing member 42 at the front end of said frame instead of rigid spacing means like wall 14 at the rear end thereof. A flip-pack spacing member 42 is hinged at its base edge to lower table 11 in any suitable manner for swinging movement between the upright operative position in dead-center relation to upper and lower tables 12 and 11 shown in solid lines in FIG. 8 and the retracted inoperative position shown in broken lines. A spring 43 biases spacing member 42 into operative position. A recess is provided in lower table 11 to shelter spacing member 42 in retracted position so that it will not obstruct introduction of a piecework board or strip when pressed inward against said member.

As shown particularly in FIGS. 1 and 2, an elongated strip 44 of wood or other saw penetrable material of rectangular cross-section is inlaid in lower table 11 directly underneath blade B of saw S to extend parallel to the path of travel of said saw on its track member 19, so that a visual guide groove 45 will be cut by blade B in the top face of strip 44 for a purpose to be explained presently. In order that strip 44 may be replaced readily when it becomes objectionably worn, I have provided clamping means to secure it detachably to lower table 11. This means utilizes base flange 18 as a stationary clamping jaw for cooperation with a movable jaw constituted by the vertical flange 46 of an L-shaped angle member 47. A horizontal clamping bolt 47' pierces flanges 18 and 46 to serve as means to secure strip 44 in the desired relation to saw blade B. Visual guide groove 45 serves as means to aid the operator of my device in determining the degree of lateral penetration of workpiece passage 13 by the workpiece stock for each cut.

*Operation*

The mode of operation which can be practiced with my improved saw and miter guide will be described in relation to the several typical saw cuts involved in production of corner molding and base boards for the rooms of a building in order to demonstrate the versatility and speedy mass production capabilities of the device.

Assuming that the rooms of the hypothetical building require a carefully calculated number of right-hand and left-hand workpieces of corner molding of several different lengths and a related number of workpiece baseboards, it may be expedient to supply the corner molding to the carpenters before the base boards. Therefore, someone measures off and marks stock strips of molding with a pencil at the points where 45 degree miter cuts are to be sawed, both right-hand and left-hand. Then, the marked stock for right-hand mitered cuts may be fed to the saw operator first before that to be given left-hand cuts. (See FIG. 6.)

The saw operator, if he be right-handed, inserts each workpiece W into workpiece passage 13 of frame 10 and through appropriate spaces between main guide stops 20-21-22-23 until it is moved into backing abutment against left-rear guide stop 20 and right-front guide stop 23. This quick movement is followed by lengthwise adjustment of workpiece W until the length determining pencil mark registers with the saw cut groove 45 in visual guide strip 44. Thereafter, the operator holds workpiece W firmly in abutment against the selected guide stops with his left hand while he moves saw S with his right hand to execute the mitered cut. These coordinated steps are repeated with successive workpieces W until the required number of right-hand cuts have been made.

Left-hand mitered cuts are made with each workpiece W' in backing abutment against right-rear main guide stop 21 and left-front main guide stop 22.

Right-angled, or square cuts, may be made as shown in FIG. 5 after pressing workpieces W''' into backing abutment against either the front pair of main guide stops 22-23 or the rear pair of main guide stops 20-21. In so doing, workpieces of slender molding stock may be inserted through the space between the respective front and rear main guide stops 22-23 and 20-21 if desired, but workpiece stock too wide for such insertion will have to be placed in backing abutment in front of front main guide stops 22-23 and in rear of rear main guide stops 20-21.

Whenever the workpiece stock to be miter-cut is molding too wide to be inserted through the spaces between main guide stops 20-21-22-23, supplementary fixed guide stops 30 and 31 are utilized in the manner shown in FIG. 7. For a right-hand cut, workpiece Wa is placed in backing abutment against main guide stop 21 and supplementary guide stop 30, whereas, for a left-hand cut, workpiece Wb is placed in backing abutment against main guide stop 23 and supplementary guide stop 31.

If, for any reason, it is desired to substitute translatable supplementary guide stop 34 for either one or both of the fixed supplementary guide stops 30-31, this may be done quickly and easily. Its use for a left-hand 45 degree cut is shown in FIG. 7, wherein it is slid along guide groove 40 until index ridge 41 registers with the 45 degree division of scale 41'. At this point, screw 38 is adjusted to clamp supplementary guide stop 34 in set relation to lower table 11. In this position, an imaginary line tangential to the peripheral faces of main guide stops 22 and 31 will also be tangential to the peripheral face of movable jaw 37 of supplementary guide stop 34. However, this is only an incidental use of translatable supplementary guide stop, for its primary purpose is to make it possible by adjustment of index ridge 41 along scale 41' to make mitered cuts at angles ranging from 0 to 90 degrees.

While the invention has been illustrated and described with respect to a few particular embodiments thereof, it will be understood that it is intended to cover all changes and modifications of the embodiments shown which do not constitute departures from the spirit of the invention and scope of the appended claims.

I claim:
1. A portable saw and mitre guide comprising:
   a rectangular work piece-supporting lower table having side, front and rear edges;
   a rectangular upper table to support a portable power driven rotary saw including a base having an underneath front-to-rear straight guide groove, said upper table being arranged with its side edges parallel to the corresponding side edges of the lower table;
   a track member extending along the top face of the upper table parallel to the side edges thereof for guiding engagement with the saw base guide groove;
   spacing means to support the upper table in parallel spaced relation above the lower table and thereby provide a transverse through work piece-passage therebetween;
   work piece angle-positioning guide stops disposed between the upper and lower tables for backing abutment against each work piece inserted into the through work piece passage;
   at least one side edge portion of the lower table having a straight longitudinal groove in its upper face;
   fore-and-aft adjustable supplementary work piece angle-positioning guide stop means including a C-shaped clamp body embracing the grooved edge portion of the lower table and having a stationary lower jaw underlying said edge portion;
   a vertically adjustable clamping screw in screw-threaded engagement with the upper portion of said clamp body;
   a movable jaw swiveled on the lower end of said clamping screw and being of disk-shape having a cylindrical outer peripheral stop face;
   and a diametrical spline provided on the underneath face of said movable jaw for longitudinal sliding engagement with the groove of said lower table.

2. The invention defined in claim 1,
   wherein there are at least four vertical main work piece angle-positioning guide stops of circular cross-section arranged at the corners of a horizontal square having its diagonals at a forty-five degree angle to the track strip;
   wherein the peripheral face of the movable clamp jaw has an index mark arranged at right-angles to the spline on the underneath face thereof;
   and wherein a scale of measurement graduated in degrees of miter cut angles closely parallels the groove in the lower table and has its point of origin so located that a straight line tangential to a main work piece-positioning guide stop at the side of said lower table opposite to the groove and arranged at forty-five degrees to said groove will be tangential to the periphery of said movable clamp jaw.

3. A portable saw and miter guide comprising:
   a work piece-supporting lower table having front, side and rear edges;

means comprising an upper table for supporting a power-driven rotary saw in such a manner that the rotary blade of the saw extends substantially from the upper table to the lower table;

means extending substantially from the front to rear edge of the upper table for guiding the saw along a substantially straight line;

means for supporting the upper table on the lower table comprising a first supporting post near the front end of the upper table, a second supporting post near the rear end of the upper table, and four third supporting posts near the center of the upper table;

said four third supporting posts being arranged at the corners of a horizontal square having its diagonal at a forty-five degree angle with respect to said straight line, whereby a work piece can be supported against one pair of said third posts at a ninety degree angle with respect to said straight line, and against a different pair of third posts at a forty-five degree angle with respect to said straight line.

4. The portable saw and miter guide of claim 3 further comprising:

supplementary support posts in the front and in the rear of said third support posts;

said supplementary posts each being aligned with one of said third posts at a forty-five degree angle with respect to said straight line, whereby work pieces that are too wide for insertion between the third support posts may be braced against one of said third support posts and one of said supplementary support posts for positioning it at a forty-five degree angle with respect to said straight line;

said third posts being permanently affixed;

said supplementary support posts being removable, thereby permitting relatively wide work pieces to be braced against two of said third support posts at a ninety degree angle with respect to said straight line.

5. The portable saw and miter guide of claim 4 wherein:

said first support post is hinged to the lower table for movement between an operative position in which it is upright, and an inoperative position in which it is countersunk into a recess in the lower table;

and means for spring-biasing said first support at its operative position, whereby a work piece may be inserted between the upper and lower tables by depressing the first support post.

6. The portable saw and miter guide of claim 5 further comprising:

a straight strip of saw-penetrable material adapted to be replaceably mounted parallel to said straight line and flush with the upper face of the lower table, whereby it may be grooved by the saw in its travel along said straight line and thereby give a visual indication of the path of travel of the saw blade.

References Cited by the Examiner
UNITED STATES PATENTS

| | | | |
|---|---|---|---|
| 1,393,126 | 10/21 | Hinds | 143—90 |
| 1,697,873 | 1/29 | Lambert. | |
| 1,706,115 | 3/29 | Hannah. | |
| 2,396,961 | 3/46 | Meredith. | |
| 2,708,465 | 5/55 | Huebner et al. | |
| 2,818,892 | 1/58 | Price. | |
| 2,949,139 | 8/60 | Nolte. | |

WILLIAM W. DYER, Jr., *Primary Examiner.*

DONALD R. SCHRAN, *Examiner.*